(12) United States Patent
Singh et al.

(10) Patent No.: US 8,809,254 B2
(45) Date of Patent: *Aug. 19, 2014

(54) AZEOTROPE-LIKE COMPOSITIONS OF PENTAFLUOROETHANE AND TRIFLUOROIODOMETHANE

(71) Applicant: Honeywell International Inc., Morristown, NJ (US)

(72) Inventors: Rajiv Ratna Singh, Getzville, NY (US); Hang T. Pham, Amherst, NY (US); Robert G. Richard, Hamburg, NY (US)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/064,336

(22) Filed: Oct. 28, 2013

(65) Prior Publication Data

US 2014/0048737 A1 Feb. 20, 2014

Related U.S. Application Data

(63) Continuation of application No. 12/352,855, filed on Jan. 13, 2009, now Pat. No. 8,598,107.

(51) Int. Cl.
*C11D 7/50* (2006.01)
(52) U.S. Cl.
CPC ............ *C11D 7/5063* (2013.01); *C11D 7/5018* (2013.01); *C11D 7/50* (2013.01)
USPC .............. 510/408; 510/407; 510/412; 252/67

(58) Field of Classification Search
CPC .... C09K 5/044; C11D 7/5063; C11D 7/5018; C11D 7/50
USPC .............................. 510/408, 407, 412; 252/67
See application file for complete search history.

(56) References Cited

U.S. PATENT DOCUMENTS

| 5,182,040 | A | 1/1993 | Bartlett et al. |
| 5,648,017 | A | 7/1997 | Bartlett et al. |
| 6,612,243 | B1 | 9/2003 | Italiane et al. |
| 7,083,742 | B1 * | 8/2006 | Nimitz et al. ..................... 252/8 |
| 2005/0145820 | A1 * | 7/2005 | Waldrop et al. ................... 252/3 |
| 2006/0243945 | A1 * | 11/2006 | Minor et al. .................... 252/67 |

FOREIGN PATENT DOCUMENTS

JP 08277389 A * 10/1996

OTHER PUBLICATIONS

Kim et al., A Study to Determine the Existence of an Azeotopic R-22 "Drop-In," prepared by U.S. Department of Commerce for Electric Power Research Institute, Mar. 1996, pp. 1-45, U.S.
Morrison, et al., Azeotropy in Refrigerant Mixtures, International Journal of Refrigeration, 1993, pp. 129-138, vol. 16, No. 2 U.S.

* cited by examiner

*Primary Examiner* — Gregory Webb
(74) *Attorney, Agent, or Firm* — Erika S. Wilson

(57) ABSTRACT

Provided are azeotrope-like compositions comprising heptafluoropropane and trifluoroiodomethane and uses thereof, including use in refrigerant compositions, refrigeration systems, blowing agents, fire suppressant compositions, and aerosol propellants.

10 Claims, 1 Drawing Sheet

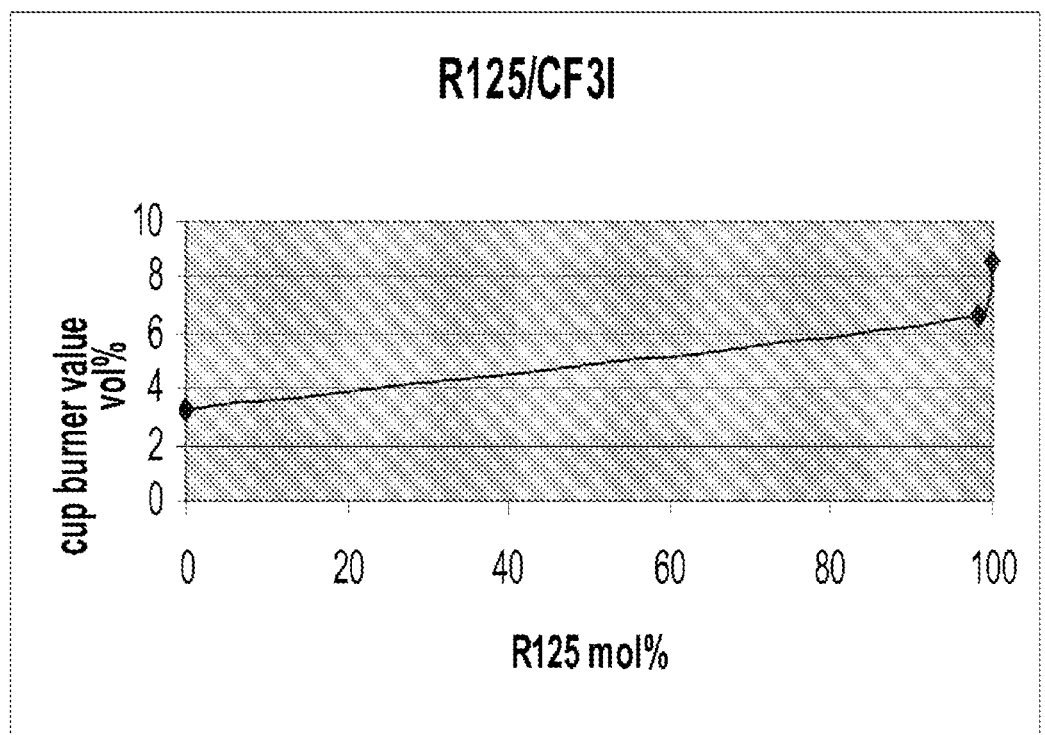

AZEOTROPE-LIKE COMPOSITIONS OF PENTAFLUOROETHANE AND TRIFLUOROIODOMETHANE

CROSS-REFERENCE TO RELATED APPLICATIONS

This application is a continuation of commonly owned U.S. patent application Ser. No. 12/352,855, filed Jan. 13, 2009, now U.S. Pat. No. 8,598,107, the disclosure of which is hereby incorporated herein by reference.

FIELD OF THE INVENTION

The present invention relates to azeotrope-like compositions. More particularly, the invention relates to azeotrope-like compositions comprising hydrohalocarbons.

BACKGROUND OF THE INVENTION

Fluorocarbon based fluids have found widespread use in industry in a number of applications, including as refrigerants, aerosol propellants, blowing agents, heat transfer media, gaseous dielectrics, fire suppression with or without extinguishing and fire/explosion prevention. However, certain compounds such as chlorofluorocarbons (CFCs) and hydrochlorofluorocarbons (HCFCs) are suspected of depleting atmospheric ozone and, thus, are harmful to the environment. Moreover, some of these compounds are believed to contribute to global warming. Accordingly, it is desirable to use fluorocarbon fluids having low or even zero ozone depletion potential, such as hydrofluorocarbons (HFCs), or those with a photolyzable carbon iodine, which exhibit short atmospheric lifetime when released at ground level. The use of single component fluids or azeotropic mixtures, which do not fractionate on boiling and evaporation, is also desirable.

Unfortunately, the identification of new, environmentally-safe, non-fractionating mixtures is complicated due to the fact that azeotrope formation is not readily predictable.

The industry is continually seeking new fluorocarbon based mixtures that offer alternatives, and are considered environmentally safer substitutes for CFCs, HCFCs and HFCs in use today. Of particular interest are mixtures containing hydrofluorocarbons, fluoroolefins, iodide containing compounds and other fluorinated compounds, which have low ozone depletion potentials and low global warming potentials. Such mixtures are the subject of this invention.

SUMMARY OF THE INVENTION

It is well-recognized in the art that it is not possible to predict the formation of azeotropes. See, for example, U.S. Pat. No. 5,648,017 (column 3, lines 64-65) and U.S. Pat. No. 5,182,040 (column 3, lines 62-63), both of which are incorporated herein by reference. Applicants have discovered unexpectedly that $CF_3I$ and pentafluoroethane (HFC-125) form azeotrope-like compositions. Such compositions are useful in numerous applications, particularly including fire suppressants, refrigerants, blowing agents for foamable compositions, sprayable compositions, and the like.

Accordingly, one aspect of the invention provides a composition comprising an azeotrope-like composition having effective amounts of HFC-125 and $CF_3I$.

According to another aspect of the invention, provided is a method of making an azeotrope-like composition comprising blending effective amounts of HFC-125 and $CF_3I$.

According to another aspect of the invention, provided is a fire suppression system comprising a fire suppressant, wherein said fire suppressant comprises an azeotrope-like composition consisting essentially of effective amounts of HFC-125 and $CF_3I$.

According to another aspect of the invention, provided is a method for suppressing fires, explosions, or other combustion-related hazards comprising applying an azeotrope-like composition consisting essentially of effective amounts of HFC-125 and $CF_3I$ to the hazard.

According to another aspect of the invention, provided is a refrigerant comprising an azeotrope-like composition consisting essentially of effective amounts of HFC-125 and $CF_3I$.

According to another aspect of the invention, provided is a refrigerant system comprising an azeotrope-like composition consisting essentially of effective amounts of HFC-125 and $CF_3I$.

According to another aspect of the invention, provided is a method of cooling or heating an article comprising contacting the article with an azeotrope-like composition consisting essentially of effective amounts of HFC-125 and $CF_3I$, prior and/or subsequent to subjecting the azeotrope-like composition to a phase change (e.g., changing the physical state of the composition from a liquid to a gas or from a gas to a liquid).

According to another aspect of the invention, provided is a method of replacing an existing refrigerant from a refrigeration system comprising removing at least a portion of the existing refrigerant from the system and subsequently and/or simultaneously introducing a replacement refrigerant into the system, wherein the replacement refrigerant comprises an azeotrope-like composition consisting essentially of effective amounts of HFC-125 and $CF_3I$.

According to another aspect of the invention, provided is a blowing agent for foamable compositions comprising an azeotrope-like composition consisting essentially of effective amounts of HFC-125 and $CF_3I$.

According to another aspect of the invention, provided is a closed-cell foam comprising a cell wall and a cell gas, wherein said cell gas comprises an azeotrope-like composition consisting essentially of effective amounts of HFC-125 and $CF_3I$.

According to another aspect of the invention, provided is a sprayable composition comprising a material to be sprayed and an azeotrope-like composition consisting essentially of effective amounts of HFC-125 and $CF_3I$.

BRIEF DESCRIPTION OF THE DRAWING

FIG. 1 is a graph showing the fire suppressant capacity of an azeotrope-like composition according to a preferred embodiment of the invention.

DETAILED DESCRIPTION OF THE INVENTION

The present invention provides azeotrope-like compositions comprising, and preferably consisting essentially of 1,1,2,2,2-pentafluoroethane (HFC-125) and trifluoroiodomethane ($CF_3I$). Each of these two components is commercially available.

The preferred azeotrope-like compositions exhibit certain physical properties that are similar to those of conventional CFCs, HCFCs, and HFCs, but exhibit relatively lower global warming potentials (GWPs). Such compounds can be used as replacements for CFCs, HCFCs, and HFCs (particularly HFC-134a) in many applications including refrigerant, aerosol, blowing agents, fire suppressant with or without extinguishing and other applications.

As used herein, the term "azeotrope-like" relates to compositions that are strictly azeotropic or that generally behave like azeotropic mixtures. An azeotropic mixture is a system of two or more components in which the liquid composition and vapor composition are equal at the stated pressure and temperature. In practice, this means that the components of an azeotropic mixture are constant-boiling or essentially constant-boiling and generally cannot be thermodynamically separated during a phase change. The vapor composition formed by boiling or evaporation of an azeotropic mixture is identical, or substantially identical, to the original liquid composition. Thus, the concentration of components in the liquid and vapor phases of azeotrope-like compositions change only minimally, if at all, as the composition boils or otherwise evaporates. In contrast, boiling or evaporating nonazeotropic mixtures changes the component concentrations in the liquid phase to a significant degree.

Thus, a characteristic of azeotrope-like compositions is that there is a range of compositions containing the same components in varying proportions that are azeotrope-like or constant boiling. All such compositions are intended to be covered by the terms "azeotrope-like" and "constant boiling". As an example, it is well known that at differing pressures, the composition of a given azeotrope will vary at least slightly, as does the boiling point of the composition. Thus, an azeotrope of A and B represents a unique type of relationship, but with a variable composition depending on temperature and/or pressure. It follows that, for azeotrope-like compositions, there is a range of compositions containing the same components in varying proportions that are azeotrope-like. All such compositions are intended to be covered by the term azeotrope-like as used herein.

As used herein, the term "consisting essentially of", with respect to the components of an azeotrope-like composition, means the composition contains the indicated components in an azeotrope-like ratio, and may contain additional components provided that the additional components do not form new azeotrope-like systems. For example, azeotrope-like mixtures consisting essentially of two compounds are those that form binary azeotropes, which optionally may include one or more additional components, provided that the additional components do not render the mixture nonazeotropic and do not form an azeotrope with either or both of the compounds.

The term "effective amounts" as used herein refers to the amount of each component which, upon combination with the other component, results in the formation of an azeotrope-like composition of the present invention.

In certain preferred embodiments, the azeotrope-like mixture consists essentially of from greater than zero to about 50 weight percent $CF_3I$ and from about 50 to less than 100 weight percent of HFC-125, more preferably about 0.1 to about 10 weight percent $CF_3I$ and from about 90 to about 99.9 weight percent of HFC-125, and most preferably from about 0.1 to about 5 weight percent $CF_3I$ and from about 95 to about 99.9 weight percent of HFC-125.

In certain embodiments, the azeotrope-like mixture consists essentially of HFC-125 and $CF_3I$ and has a boiling point of about −48±1° C., more preferably about −48.0±0.6° C., and even more preferably about −48.50±0.06° C., all at a pressure of about 14.5 psia.

The azeotrope-like compositions of the present invention may further include a variety of optional additives including, but not limited to, lubricants, stabilizers, metal passivators, corrosion inhibitors, flammability suppressants, and the like. Preferably, these optional additives do not affect the basic azeotrope-like characteristics of the composition.

Also provided are methods of producing an azeotrope-like composition comprising blending trifluoroiodomethane ($CF_3I$) with 1,1,2,2,2-pentafluoroethane (HFC-125) in amounts effective to produce an azeotrope-like composition. Both $CF_3I$ and HFC-125 can be purchased commercially from a variety of sources. The azeotrope-like compositions of the present invention can be produced by combining effective amounts of 1,1,2,2,2-pentafluoroethane (HFC-125) and trifluoroiodomethane ($CF_3I$).

Any of a wide variety of methods known in the art for combining two or more components to form a composition can be adapted for use in the present methods to produce an azeotrope-like composition. For example, 1,1,2,2,2-pentafluoroethane (HFC-125) and trifluoroiodomethane ($CF_3I$) can be mixed, blended, or otherwise contacted by hand and/or by machine, as part of a batch or continuous reaction and/or process, or via combinations of two or more such steps. In light of the disclosure herein, those of skill in the art will be readily able to prepare azeotrope-like compositions according to the present invention without undue experimentation.

The present compositions have utility in a wide range of applications which are exemplified by the uses described below.

Fire Extinguishing

A preferred embodiment of the present invention relates to fire suppressants, with or without extinguishing, in total flooding and streaming firefighting or control applications.

As used herein, the terms "fire suppression system" mean a system for preventing, mitigating, extinguishing, or otherwise controlling a fire, explosion, and/or other combustion-related hazards.

Total flooding methods are particularly applicable to prevent and/or suppress such hazards in enclosed spaces such as rooms, vaults, enclosed machines, ovens, containers, storage tanks, airplane or ship cargo bays, bins and like areas. According to this method, the enclosed area is flooded with a gaseous agent, preferably a gaseous agent comprising, or consisting essentially of, the azeotrope-like compositions described herein.

To prevent or inhibit fire- or explosion-related hazards in open areas, a streaming method is preferably used to transport to the hazard a gaseous agent comprising, or consisting essentially of, the azeotrope-like compositions as described herein. In a streaming application, the agent is preferably expelled from an extinguishing device by mechanical means or by a change in pressure of the fluid agent. The stream maybe a continuous stream or a mist. This can be effective at fire suppression. These types of fires include crash scenes, airport or aircraft carrier flight decks, airplanes engine nacelles, etc.

In certain preferred embodiments, the fire suppressant system comprises a suppressant agent comprising an azeotrope-like composition described herein. In certain preferred embodiments, particularly embodiments adapted to flooding methods, the system further comprises one or more orifices fluidly connected to said suppressant. It is through these orifices that the suppressant passes from a storage container or system to an enclosed space.

Preferably the orifices are disposed to rapidly flood the enclosed space with the suppressant.

In certain embodiments, particularly embodiments adapted to streaming methods, the fire suppressant system comprises at least one conduit fluidly connected to the suppressant.

The conduit is useful for directing a stream of suppressant to the fire to be controlled. In certain embodiments the conduit is flexible, such as flexible hoses or tubing. In certain embodiments, at least some portion of the conduit is at least partially rigid, but is rotatable or pivotal about a fixed point so that a stream of the suppressant can be directed to the fire to be controlled.

Refrigerants

Another preferred embodiment of the invention is a refrigerant composition comprising, or consists essentially of, azeotrope-like compositions as described herein. These refrigerant compositions may be used in any of a wide variety of refrigeration systems including air-conditioning, refrigeration, heat-pump systems, and the like. In certain preferred embodiments, the compositions of the present invention are used in refrigeration systems originally designed for use with an HFC-refrigerant, such as, for example, HFC-134a. The preferred compositions of the present invention tend to exhibit many of the desirable characteristics of HFC-134a and other HFC-refrigerants, including nonflammability, and a GWP that is as low, or lower than that of conventional HFC-refrigerants.

In addition, the relatively constant boiling nature of the compositions of the present invention makes them even more desirable than certain conventional HFCs for use as refrigerants in many applications.

In certain other preferred embodiments, the present compositions are used in refrigeration systems originally designed for use with a CFC-refrigerant. Preferred refrigeration compositions of the present invention may be used in refrigeration systems containing a lubricant used conventionally with CFC-refrigerants, such as mineral oils, silicone oils, and the like, or may be used with other lubricants traditionally used with HFC refrigerants.

In certain embodiments, the compositions of the present invention may be used to retrofit refrigeration systems containing HFC, HCFC, and/or CFC-refrigerants and lubricants used conventionally therewith. Preferably, the present methods involve recharging a refrigerant system that contains a refrigerant to be replaced and a lubricant comprising the steps of (a) removing the refrigerant to be replaced from the refrigeration system while retaining a substantial portion of the lubricant in said system; and (b) introducing to the system a composition of the present invention. As used herein, the term "substantial portion" refers generally to a quantity of lubricant which is at least about 50% (by weight) of the quantity of lubricant contained in the refrigeration system prior to removal of the chlorine containing refrigerant. Preferably, the substantial portion of lubricant in the system according to the present invention is a quantity of at least about 60% of the lubricant contained originally in the refrigeration system, and more preferably a quantity of at least about 70%.

As used herein the term "refrigeration system" refers generally to any system or apparatus, or any part or portion of such a system or apparatus, which employs a refrigerant to provide cooling. Such refrigeration systems include, for example, air conditioners, electric refrigerators, chillers, transport refrigeration systems, commercial refrigeration systems and the like.

Any of a wide range of known methods can be used to remove refrigerants to be replaced from a refrigeration system while removing less than a major portion of the lubricant contained in the system. For example, because refrigerants are quite volatile relative to traditional hydrocarbon-based lubricants (the boiling points of refrigerants are generally less than 10° C. whereas the boiling points of mineral oils are generally more than 200° C.), in embodiments wherein the lubricant is a hydrocarbon-based lubricant, the removal step may readily be performed by pumping the refrigerants in the gaseous state out of a refrigeration system containing liquid state lubricants. Such removal can be achieved in any of a number of ways known in the art, including, the use of a refrigerant recovery system, such as the recovery system manufactured by Robinair of Ohio.

Alternatively, a cooled, evacuated refrigerant container can be attached to the low pressure side of a refrigeration system such that the gaseous refrigerant is drawn into the evacuated container and removed. Moreover, a compressor may be attached to a refrigeration system to pump the refrigerant from the system to an evacuated container. In light of the above disclosure, those of ordinary skill in the art will be readily able to remove chlorine-containing lubricants from refrigeration systems and to provide a refrigeration system having therein a hydrocarbon-based lubricant and substantially no chlorine-containing refrigerant according to the present invention.

Any of a wide range of methods for introducing the present refrigerant compositions to a refrigeration system can be used in the present invention. For example, one method comprises attaching a refrigerant container to the low-pressure side of a refrigeration system and turning on the refrigeration system compressor to pull the refrigerant into the system. In such embodiments, the refrigerant container may be placed on a scale such that the amount of refrigerant composition entering the system can be monitored. When a desired amount of refrigerant composition has been introduced into the system, charging is stopped.

Alternatively, a wide range of charging tools, known to those of skill in the art, is commercially available. Accordingly, in light of the above disclosure, those of skill in the art will be readily able to introduce the refrigerant compositions of the present invention into refrigeration systems according to the present invention without undue experimentation.

According to certain other embodiments, the present invention provides refrigeration systems comprising a refrigerant of the present invention and methods of producing heating or cooling by condensing and/or evaporating a composition of the present invention. In certain preferred embodiments, the methods for cooling an article according to the present invention comprise condensing a refrigerant composition comprising an azeotrope-like composition of the present invention and thereafter evaporating said refrigerant composition in the vicinity of the article to be cooled. Certain preferred methods for heating an article comprise condensing a refrigerant composition comprising an azeotrope-like composition of the present invention in the vicinity of the article to be heated and thereafter condensing said refrigerant composition. In light of the disclosure herein, those of skill in the art will be readily able to heat and cool articles according to the present inventions without undue experimentation.

Sprayable Compositions

In another embodiment, the azeotrope-like compositions of this invention may be used as propellants in sprayable compositions, either alone or in combination with known propellants. The propellant composition comprises, more preferably consists essentially of, and, even more preferably, consists of the azeotrope-like compositions described herein. The active ingredient to be sprayed together with inert ingredients, solvents, and other materials may also be present in the sprayable mixture. Preferably, the sprayable composition forms an aerosol. Suitable active materials to be sprayed include, without limitation, cosmetic materials such as deodorants, perfumes, hair sprays, cleansers, defluxing agents, and polishing agents as well as medicinal materials such as anti-asthma and anti-halitosis medications.

Blowing Agents

Yet another embodiment of the present invention relates to a blowing agent comprising one or more azeotrope-like compositions of the invention. In other embodiments, the invention provides foamable compositions, and preferably polyurethane and polyisocyanurate foam compositions, and methods of preparing foams. In such foam embodiments, one or more of the present azeotrope-like compositions are included as a blowing agent in a foamable composition, which composition preferably includes one or more additional components capable of reacting and foaming under the proper conditions to form a foam or cellular structure, as is well known in the art. Any of the methods well known in the art, such as those described in "Polyurethanes Chemistry and Technology," Volumes I and II, Saunders and Frisch, 1962, John Wiley and Sons, New York, N.Y., which is incorporated herein by reference, may be used or adapted for use in accordance with the foam embodiments of the present invention.

Other uses of the present azeotrope-like compositions include use as solvents, cleaning agents, and the like. Those of skill in the art will be readily able to adapt the present compositions for use in such applications without undue experimentation.

EXAMPLES

The invention is further illustrated in the following example which is intended to be illustrative, but not limiting in any manner.

Example 1

An ebulliometer consisting of a vacuum jacketed tube with a condenser on top which is further equipped with a Quartz Thermometer is used. About 23.95 g of HFC-125 is charged to the ebulliometer and then $CF_3I$ is added in small, measured increments. Temperature depression is observed when $CF_3I$ is added to HFC-125, indicating a binary minimum boiling azeotrope is formed. From greater than about 0 to about 10 weight percent $CF_3I$, the boiling point of the composition stays below or around the boiling point of HFC-125. The boiling temperature of HFC-125 is about −48.5° C. at 14.5 psia. The binary mixtures shown in Table 1 were studied and the boiling point of the compositions did not go above the boiling point of HFC-125. The compositions exhibit azeotrope and/or azeotrope-like properties over this range.

TABLE 1

| HFC-125/$CF_3I$ compositions at 14.5 psia | | |
|---|---|---|
| T (C.) | Wt. % HFC-125 | Wt. % $CF_3I$ |
| −48.49 | 100.00 | 0.0 |
| −48.54 | 99.34 | 0.66 |
| −48.56 | 97.91 | 2.09 |
| −48.44 | 90.51 | 9.49 |
| −48.15 | 80.72 | 19.28 |
| −47.91 | 74.31 | 25.69 |
| −47.84 | 71.13 | 28.87 |
| −47.60 | 62.29 | 37.71 |
| −47.42 | 53.98 | 46.02 |
| −47.40 | 52.11 | 47.89 |

Example 2

A NFPA 2001-2000ed cup burner using heptane as the fuel and an air flow rate of 24 liter/min has been used to obtain extinguishing concentrations for $CF_3I$, R125, R227ea, R125/$CF_3I$ (98.2/1.8 mol %) and $N_2$. The R125/$CF_3I$ mixture performed significantly better than is predicted from linear combination of the pure materials' extinguishing compositions (see FIG. 1 & Table 2).

TABLE 2

|  | cup burner value vol % | wt. % | mol. % |
|---|---|---|---|
| $CF_3I$ | 3.28 | 100 | 100 |
| R125 | 8.54 | 100 | 100 |
| R227ea | 6.24 | 100 | 100 |
| R125/$CF_3I$ | 6.58 | 97.2 | 98.2 |
| $N_2$ | 28.18 | 100 | 100 |

What is claimed is:

1. An azeotrope-like composition which consists of from about 50 to less than 100 weight percent of HFC-125, and from greater than zero to about 50 weight percent $CF_3I$, said composition having a boiling point of about −48±1° C. at a pressure of about 14.5 psia.

2. The azeotrope-like composition of claim 1 consisting of 99.34 weight percent HFC-125 and 0.66 weight percent $CF_3I$.

3. The azeotrope-like composition of claim 1 consisting of 97.91 weight percent HFC-125 and 2.09 weight percent $CF_3I$.

4. The azeotrope-like composition of claim 1 consisting of 90.51 weight percent HFC-125 and 9.49 weight percent $CF_3I$.

5. The azeotrope-like composition of claim 1 consisting of 80.72 weight percent HFC-125 and 19.28 weight percent $CF_3I$.

6. The azeotrope-like composition of claim 1 consisting of 74.31 weight percent HFC-125 and 25.69 weight percent $CF_3I$.

7. The azeotrope-like composition of claim 1 consisting of 71.13 weight percent HFC-125 and 28.87 weight percent $CF_3I$.

8. The azeotrope-like composition of claim 1 consisting of 62.29 weight percent HFC-125 and 37.71 weight percent $CF_3I$.

9. The azeotrope-like composition of claim 1 consisting of 53.98 weight percent HFC-125 and 46.02 weight percent $CF_3I$.

10. The azeotrope-like composition of claim 1 consisting of 52.11 weight percent HFC-125 and 47.89 weight percent $CF_3I$.

* * * * *